(12) United States Patent
Kitamura

(10) Patent No.: US 11,348,242 B2
(45) Date of Patent: May 31, 2022

(54) PREDICTION APPARATUS, PREDICTION METHOD, PREDICTION PROGRAM

(71) Applicant: FUJIFILM Corporation, Tokyo (JP)

(72) Inventor: Yoshiro Kitamura, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 76 days.

(21) Appl. No.: 16/371,983

(22) Filed: Apr. 1, 2019

(65) Prior Publication Data
US 2019/0304094 A1    Oct. 3, 2019

(30) Foreign Application Priority Data

Apr. 3, 2018  (JP) .............................. JP2018-071718

(51) Int. Cl.
*G06K 9/00*   (2022.01)
*G06T 7/00*   (2017.01)
(Continued)

(52) U.S. Cl.
CPC ............ *G06T 7/0014* (2013.01); *G06N 20/00* (2019.01); *G06T 7/11* (2017.01); *G06T 7/174* (2017.01);
(Continued)

(58) Field of Classification Search
CPC ....... G06T 7/0014; G06T 7/337; G06T 7/174; G06T 7/11; G06T 2207/20081; G06T 2207/30048; G06T 2207/30101; G06T 2207/10088; G06T 2207/10081; G06T 2207/10104; G06N 20/00; G06N 3/0454; G06N 3/0472; G06N 3/08
See application file for complete search history.

(56) References Cited

U.S. PATENT DOCUMENTS

| 2010/0082506 | A1 | 4/2010 | Avinash et al. |
| 2013/0236124 | A1* | 9/2013 | Wiemker ................ G06T 11/60 382/294 |

(Continued)

FOREIGN PATENT DOCUMENTS

| JP | 2009-82453 A | 4/2009 |
| JP | 2010-86537 A | 4/2010 |

(Continued)

OTHER PUBLICATIONS

Sola, Phillip et al., Image-to-Image Translation with Conditional Adversarial Networks, Nov. 26, 2018, pp. 1-17, Berkeley AI Research Laboratory, UC Berkeley, Berkeley, California.

(Continued)

*Primary Examiner* — Dhaval V Patel
(74) *Attorney, Agent, or Firm* — Studebaker & Brackett PC

(57) ABSTRACT

A prediction apparatus includes a learning section that performs machine learning in which, with respect to a combination of different types of captured images obtained by imaging the same subject, one captured image is set to an input and another captured image is set to an output to generate a prediction model; and a controller that performs a control for inputting a first image to the prediction model as an input captured image and outputting a predicted second image that is a captured image having a type different from that of the input captured image.

18 Claims, 4 Drawing Sheets

(51) Int. Cl.
    *G06T 7/33*   (2017.01)
    *G06T 7/174*  (2017.01)
    *G06N 20/00*  (2019.01)
    *G06T 7/11*   (2017.01)

(52) U.S. Cl.
    CPC .... *G06T 7/337* (2017.01); *G06T 2207/20081* (2013.01)

(56) References Cited

U.S. PATENT DOCUMENTS

2016/0035093 A1* 2/2016 Kateb .................... G02B 23/24
                                                      382/131
2019/0197358 A1* 6/2019 Madani ................ G06N 3/0481

FOREIGN PATENT DOCUMENTS

| JP | 2013-165765 A | 8/2013 |
| JP | 2013-200590 A | 10/2013 |
| JP | 2013-544595 A | 12/2013 |
| WO | 2018/048507 A1 | 3/2018 |

OTHER PUBLICATIONS

An Office Action; "Notice of Reasons for Refusal," dated Jun. 15, 2021, which corresponds to Japanese Patent Application No. 2018-071718 and is related to U.S. Appl. No. 16/371,983 with English translation.

* cited by examiner

PREDICTION APPARATUS, PREDICTION METHOD, PREDICTION PROGRAM

CROSS-REFERENCE TO RELATED APPLICATIONS

This application is based on and claims priority under 35 USC 119 from Japanese Patent Application No. 2018-071718, filed on Apr. 3, 2018, the disclosure of which is incorporated herein by reference in its entirety.

BACKGROUND OF THE INVENTION

1. Field of the Invention

The present disclosure relates to a prediction apparatus, a prediction method, and a computer-readable storage medium storing a prediction program.

2. Description of the Related Art

In the related art, a technique for referring to a plurality of captured images of different types obtained by imaging the same portion of the same subject, particularly, captured images for medical use, for example, in diagnosis by a doctor has been used. For example, there is a case where diagnosis is performed using computed tomography (CT) captured images and magnetic resonance imaging (MRI) captured images. As a technique for supporting such diagnosis, for example, a technique for supporting diagnosis by retrieving a second medical captured image similar to a first medical captured image and having a different image format from that of the first medical captured image is disclosed in JP2013-200590A.

However, in a case where a doctor or the like performs diagnosis or the like, there is a case where only one type of captured image is present. For example, there is a case where diagnosis is performed in a state where CT captured images are only present. In such a case, the technique disclosed in JP2013-200590A cannot be applied.

SUMMARY OF THE INVENTION

In consideration of the above-mentioned problem, an object of the present disclosure is to provide a prediction apparatus, a prediction method, and a computer-readable storage medium storing a prediction program capable of supporting diagnosis even in a case where only one type of captured image is present in diagnosis by a doctor or the like.

In order to achieve the above object, according to a first aspect of the present disclosure, there is provided a prediction apparatus comprising: a learning section that performs machine learning in which, with respect to a combination of different types of captured images obtained by imaging the same subject, one captured image is set to an input and another captured image is set to an output to generate a prediction model; and a controller that performs a control for inputting a captured image to the prediction model and outputting a captured image having a type different from that of the input captured image.

According to a second aspect of the present disclosure, in the prediction apparatus according to the first aspect, the different types of captured images are all medical captured images.

According to a third aspect of the present disclosure, in the prediction apparatus according to the second aspect, the type of the captured image input to the prediction model is a form image indicating a form of an imaging target, and the type of the captured image output from the prediction model is a function image indicating a function of the imaging target.

According to a fourth aspect of the present disclosure, in the prediction apparatus according to the third aspect, the form image indicates a form of at least one of a blood vessel region or a region where a cerebrospinal fluid flows, and the function image indicates a state of at least one of infarction or necrosis.

According to a fifth aspect of the present disclosure, in the prediction apparatus according to the second aspect, one of the type of the captured image input to the prediction model and the type of the captured image output from the prediction model is a computed tomography (CT) image, and the other thereof is any one of a magnetic resonance imaging (MRI) image, a positron emission computed tomography (PET) image, or a diffusion weighted image.

According to a sixth aspect of the present disclosure, in the prediction apparatus according to the fifth aspect, the subject is a heart or a brain.

According to a seventh aspect of the present disclosure, in the prediction apparatus according to any one of the first to sixth aspects, the controller causes a display section to display the captured image output from the prediction model.

According to an eighth aspect of the present disclosure, in the prediction apparatus according to any one of the first to seventh aspects, the controller extracts an abnormal region where an abnormality occurs in the subject from the captured image output from the prediction model, and causes a display section to display a captured image input to the prediction model corresponding to the captured image from which the abnormal region is extracted and information indicating the abnormal region.

According to a ninth aspect of the present disclosure, in the prediction apparatus according to any one of the first to eighth aspects, the learning section performs the machine learning using the one captured image and an extraction result obtained by extracting an anatomical structure from the captured image input to the prediction model as inputs of the prediction model.

According to a tenth aspect of the present disclosure, in the prediction apparatus according to any one of the first to ninth aspects, the learning section aligns positions of the subject in the one captured image and the other captured image in the machine learning.

Further, in order to achieve the object, according to an eleventh aspect of the present disclosure, there is provided a prediction method for causing a computer to execute a process of: performing machine learning in which, with respect to a combination of different types of captured images obtained by imaging the same subject, one captured image is set to an input and another captured image is set to an output to generate a prediction model; and performing a control for inputting a captured image to the prediction model and outputting a captured image having a type different from that of the input captured image.

In addition, in order to achieve the object, according to a twelfth aspect of the present disclosure, there is provided a computer-readable storage medium storing a prediction program for causing a computer to execute a process of: performing machine learning in which, with respect to a combination of different types of captured images obtained by imaging the same subject, one captured image is set to an input and another captured image is set to an output to generate a prediction model; and performing a control for inputting a captured image to the prediction model and outputting a captured image having a type different from that of the input captured image.

According to the present disclosure, even in a case where only one type of captured image is present in diagnosis by a doctor or the like, it is possible to perform diagnosis support.

DESCRIPTION OF THE PREFERRED EMBODIMENTS

Hereinafter, embodiments for executing the technique of the present disclosure will be described in detail with reference to the accompanying drawings.

First Embodiment

Figure 1:
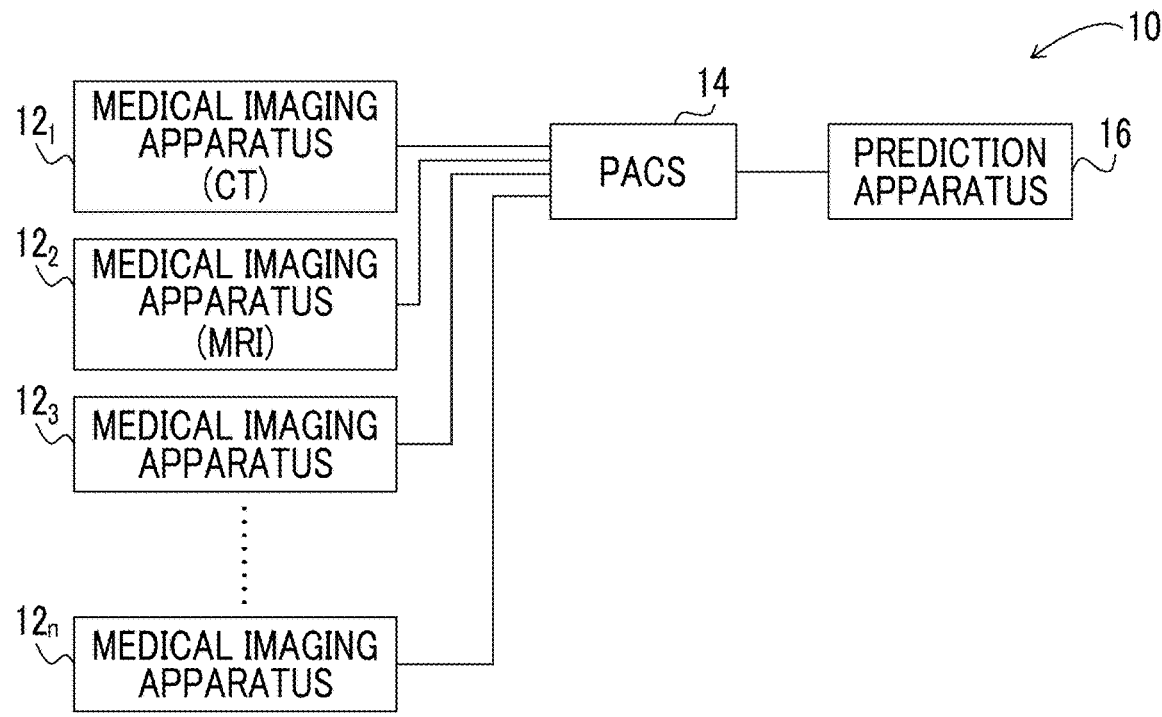
FIG. 1 is a block diagram showing an example of a configuration of a prediction system according to a first embodiment.

First, a configuration of a prediction system 10 according to this embodiment will be described with reference to FIG. 1. As shown in FIG. 1, the prediction system 10 according to this embodiment includes n (n is an integer of 1 or greater) medical imaging apparatuses 12 (medical imaging apparatuses $12_1$ to $12_n$, which may be generally referred to as a "medical imaging apparatus 12"), a picture archiving and communication system (PACS) 14, and a prediction apparatus 16. The medical imaging apparatuses 12 and the PACS 14 are respectively connected to be able to communicate with a network. Further, the PACS 14 and the prediction apparatus 16 are respectively connected to be able to communicate with the network.

The medical imaging apparatus 12 images an organ such as the brain or the heart, which is an imaging target of a person who is a subject such as a patient, and outputs image data indicating medical captured images. The medical imaging apparatus 12 is an apparatus that is capable of obtaining at least one type of medical captured image among different types of medical captured images such as medical captured images based on computed tomography (CT), magnetic resonance imaging (MRI), or positron emission computed tomography (PET) and diffusion weighted images (DWI). In this embodiment, the "different types" of medical captured images include, for example, a difference between types of apparatuses to be used for imaging, a difference between imaging methods, a difference between techniques of photographers in imaging, or a difference between a motion image and a still image, in addition to the difference between CT, MRI, PET, and DWI.

The PACS 14 stores image data indicating medical captured images captured by the medical imaging apparatuses 12.

The prediction apparatus 16 generates a prediction model 44 (see FIG. 3) (of which details will be described later) using the image data stored in the PACS 14. Further, the prediction apparatus 16 generates image data of a medical captured image having a type different from that of an input medical captured image, predicted from the image data of the input medical captured image, using the prediction model 44. As an example of the prediction apparatus 16, an information processing apparatus such as a personal computer or a server computer may be used, and as a specific example, a so-called viewer may be used.

Figure 2:
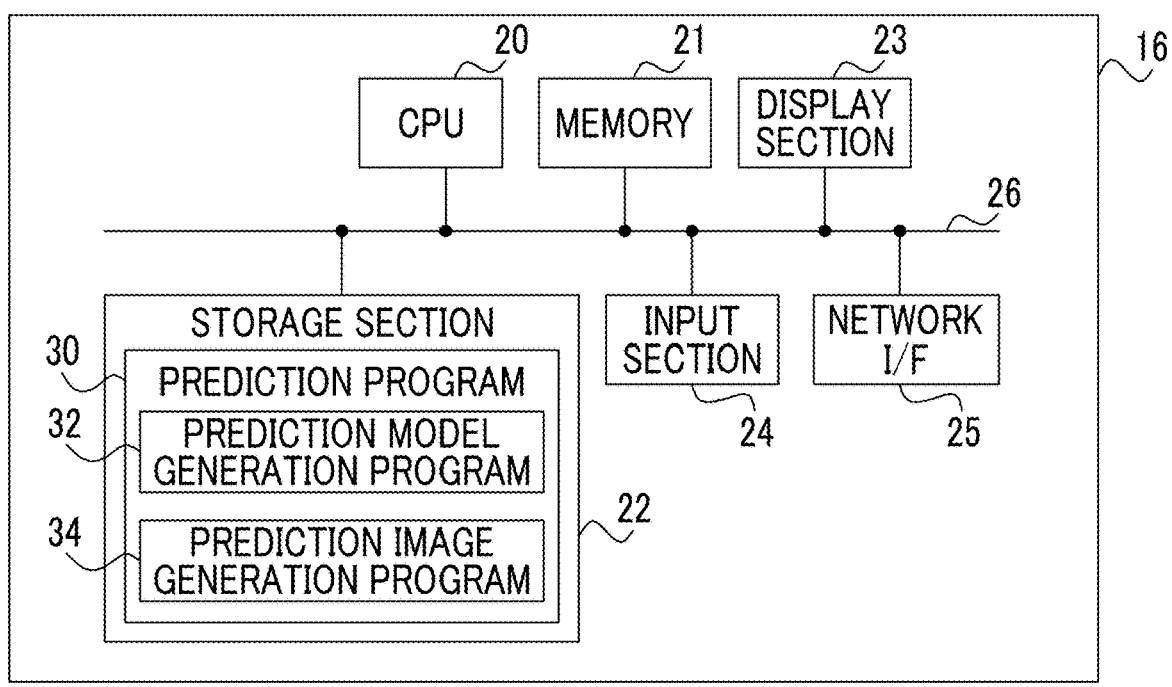
FIG. 2 is a block diagram showing an example of a hardware configuration of a prediction apparatus according to the first embodiment.

Next, a hardware configuration of the prediction apparatus 16 according to this embodiment will be described with reference to FIG. 2. As shown in FIG. 2, the prediction apparatus 16 includes a central processing unit (CPU) 20, a memory 21 that is a temporary storage, and a non-volatile storage section 22. Further, the prediction apparatus 16 includes a display section 23 such as a liquid crystal display, an input section 24 such as a keyboard or a mouse, and a network interface (I/F) 25 connected to a network N. The CPU 20, the memory 21, the storage section 22, the display section 23, the input section 24, and the network I/F 25 are connected to a bus 26.

The storage section 22 is realized by a hard disk drive (HDD), a solid state drive (SSD), a flash memory, or the like. A prediction program 30 is stored in the storage section 22 that is a storage medium. The prediction program 30 according to this embodiment includes a prediction model generation program 32 and a prediction image generation program 34. The CPU 20 respectively reads out the prediction model generation program 32 and the prediction image generation program 34 from the storage section 22, expands the readout prediction model generation program 32 and prediction image generation program 34 into the memory 21, and executes the expanded prediction model generation program 32 and prediction image generation program 34, respectively.

Figure 3:
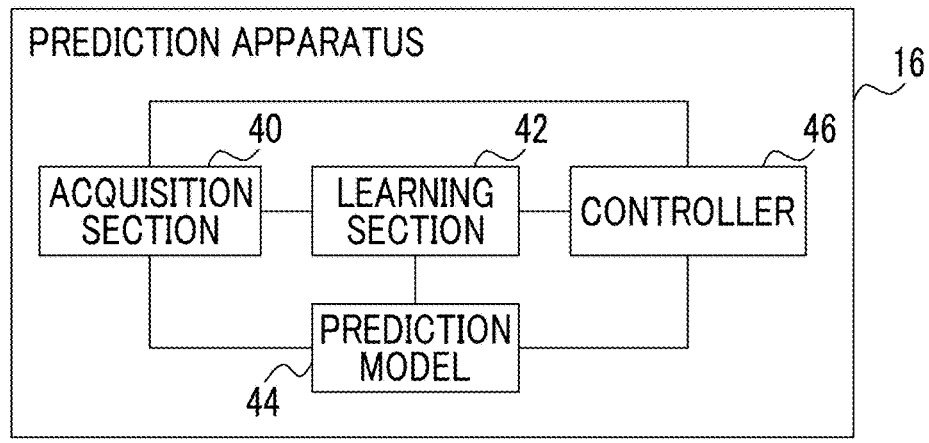
FIG. 3 is a block diagram showing an example of a functional configuration of the prediction apparatus according to the first embodiment.

Then, a functional configuration of the prediction apparatus 16 according to this embodiment will be described with reference to FIG. 3. As shown in FIG. 3, the prediction apparatus 16 includes an acquisition section 40, a learning section 42, and a controller 46. Further, the prediction apparatus 16 according to this embodiment includes the prediction model 44. As the CPU 20 executes the prediction program 30, the CPU 20 functions as the acquisition section 40, the learning section 42, the prediction model 44, and the controller 46.

The acquisition section 40 acquires image data stored in the PACS 14 from the PACS 14 through the network.

The learning section 42 generates the prediction model 44 through machine learning using the image data acquired by the acquisition section 40. As a specific example, a case where the prediction model 44 for outputting MRI medical captured image data predicted from CT medical captured image data obtained by imaging the same organ (for example, brain) of the same subject is generated will be described. In the following description, for ease of description, image data of a medical captured image input to the prediction model 44 is referred to as an "input captured image", and image data of a medical captured image output from the prediction model 44 is referred to as an "output captured image". Further, hereinafter, a CT medical captured image is referred to as a "CT image", and an MRI medical captured image is referred to as an "MRI image".

In this embodiment, an example in which an artificial intelligence (AI) technique that uses a generative adversarial network (GAN) is applied to a generation process of the prediction model 44 in the learning section 42 will be described. First, the learning section 42 prepares image data of a CT image and image data of an MRI image obtained by imaging the same organ (for example, the brain) of the same subject. The learning section 42 sets image data of a CT image as an input captured image of a generator of a GAN, and sets image data of an MRI image generated by the generator as an output captured image. Then, and the learning section 42 causes the prediction model 44 to be learned so that an error between the output image data of the MRI image and image data of a prepared true MRI image becomes minimum. Further, the learning section 42 causes a discriminator to determine whether the output captured image is true or false. In the learning, the error between the image data of the MRI image generated by the generator and the image data of the true MRI image is minimized, and a determination rate of the true and false in the discriminator is maximized.

The controller 46 sets image data acquired by the acquisition section 40 as an input captured image, and inputs the input captured image to the prediction model 44 generated by the learning section 42. Then, the controller 46 causes the prediction model 44 to generate an output captured image having a type different from that of the input captured image, which is predicted from the input captured image. Further, the controller 46 causes the display section 23 to display the output captured image that is generated and output by the prediction model 44.

Figure 4:
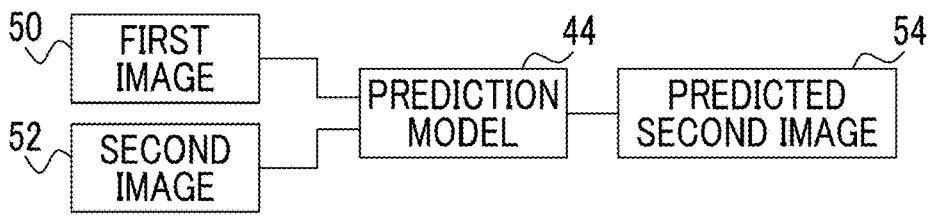
FIG. 4 is a conceptual diagram for illustrating generation of a prediction model in the first embodiment.
Figure 5:
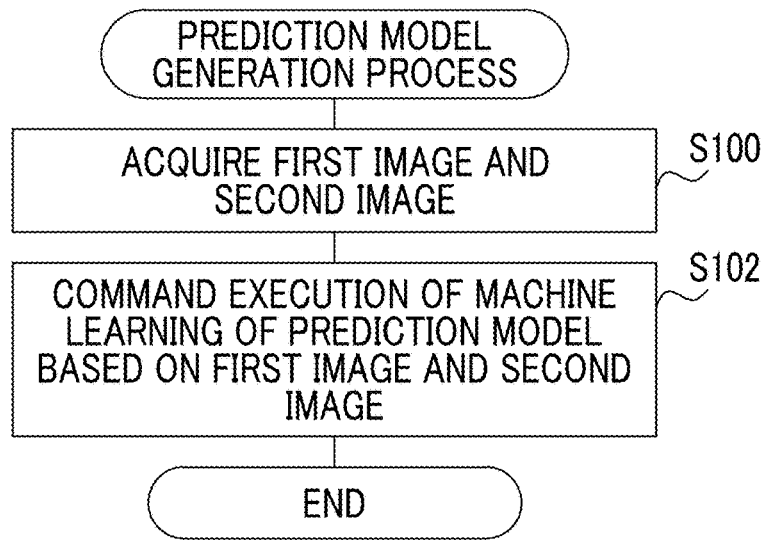
FIG. 5 is a flowchart showing an example of a prediction model generation process according to the first embodiment.

Next, an operation of the prediction apparatus 16 according to this embodiment will be described. First, the generation of the prediction model 44 in the prediction apparatus 16 will be described with reference to FIGS. 4 and 5. FIG. 4 is a conceptual diagram for illustrating the generation of the prediction model 44 in the prediction apparatus 16. As the CPU 20 executes the prediction model generation program 32, a prediction model generation process shown in FIG. 5 is executed. Further, the prediction model generation process shown in FIG. 5 is executed at a timing when a learning execution command from a manager of the prediction system 10, for example, is input through the input section 24, or at a predetermined periodic timing.

Hereinafter, an example in which the prediction model 44 generates a second image 52 that is predicted from a first image 50 and outputs the second image 52 will be described. The first image 50 and the second image 52 are different types of medical captured images relating to the same organ of the same subject as described above.

In step S100 shown in FIG. 5, the acquisition section 40 acquires one set of the first image 50 and second image 52 to be used for learning of the prediction model 44 from the PACS 14.

In the next step S102, the learning section 42 commands execution of machine learning in which the first image 50 is an input captured image and a predicted second image 54 predicted from the first image 50 is an output captured image, using the first image 50 and the second image 52 acquired by the acquisition section 40 as described above, generates the prediction model 44, and then, terminates the prediction model generation process.

For example, myocardial infarction occurs, in a case where plaque accumulates in the coronary artery and a blood flow deteriorates, when the myocardium necroses in a region where the blood flow disappears. A CT image of the heart, particularly, a contrast CT image is preferable for observation of a stenosed region where the blood flow is obstructed by plaque. On the other hand, an MRI image, particularly, a delayed contrast MRI image is preferable for observation of a necrotic myocardial region. Further, for example, in stroke or cerebral infarction, a blood flow disappears as thrombus occurs in a blood vessel, a region after the thrombus becomes an infarct region. A CT image of the brain is preferable for observation of the thrombus. On the other hand, an MRI image is preferable for observation of the infarct region. In any case, since the CT image is a form image indicating the form of an imaging target such as a pathway of blood (blood vessels) or cerebrospinal fluid and the MRI image is a function image indicating the function of an imaging target such as a state of infarction or necrosis, it is possible for a doctor or the like to easily perform diagnosis using the CT image and the MRI image together.

In order to handle such a case, the first image 50 is set to a CT image and the second image 52 is set to an MRI image to generate the prediction model 44. In this way, by performing learning using the first image 50 that is the CT image and the second image 52 that is the MRI image, it is possible to perform learning while covering a lesion portion that is not captured in the CT image and a peripheral area thereof, and thus, it is possible to generate the predicted second image 54 that is equivalent to an MRI image, in which a portion that is not captured in an original CT image is captured.

The prediction apparatus 16 according to this embodiment performs machine learning using a plurality of combinations of the first image 50 and the second image 52 by repeating the prediction model generation process plural times, to thereby generate the prediction models 44. In the generation of the prediction model 44, for example, a method for setting a subject to be different for each combination of the first image 50 and the second image 52, or a method imaging times to be different from each other even in the same subject may be used. Further, it is preferable that a large number of combinations in which a lesion is present in an organ that is an imaging target are included in the plurality of combinations of the first image 50 and the second image 52, and is also preferable that a combination in which an organ with no lesion is an imaging target is not included therein.

In a case where a doctor or the like performs diagnosis, the prediction apparatus 16 performs diagnosis support by generating the predicted second image 54 using the prediction model 44 generated by the prediction model generation process shown in FIG. 5 as described above. Next, a prediction image generation process using the prediction apparatus 16 will be described with reference to FIGS. 6 and 7.

Figure 6:
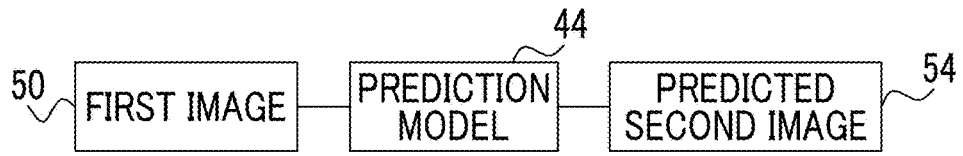
FIG. 6 is a conceptual diagram for illustrating generation of a predicted second image in the first embodiment.
Figure 7:
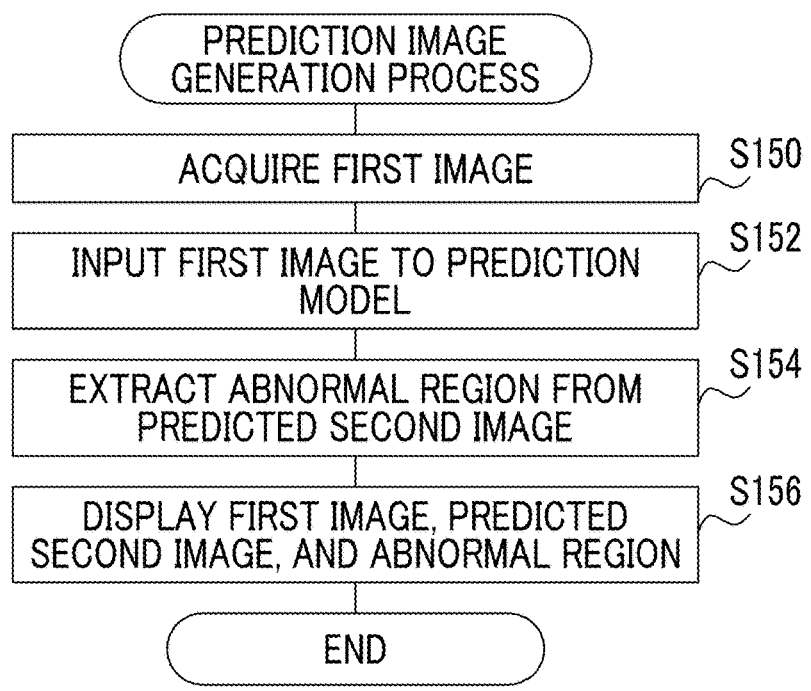
FIG. 7 is a flowchart showing an example of a prediction image generation process according to the first embodiment.

FIG. 6 is a conceptual diagram for illustrating the generation of the predicted second image 54 using the prediction model 44 in the prediction apparatus 16 for diagnosis support. As the CPU 20 executes the prediction image generation program 34, the prediction image generation process shown in FIG. 7 is executed. Further, the prediction image generation process shown in FIG. 7 is executed, for example, at a timing when a command for requesting diagnosis support from a doctor or the like is input through the input section 24. In requesting the diagnosis support, the doctor or the like performs designation for specifying the first image 50 through the input section 24. Specifically, for example, a patient identification number, an identification number for identifying a medical captured image, or the like is designated through the input section 24.

In step S150 shown in FIG. 5, the acquisition section 40 acquires the first image 50 based on the designation of the doctor or the like who has requested the diagnosis support from the PACS 14.

In the next step S152, the controller 46 causes the first image 50 acquired by the acquisition section 40 to be input to the prediction model 44. As shown in FIG. 6, the prediction model 44 generates the predicted second image 54 predicted from the input first image 50, and outputs the result to the controller 46.

In the next step S154, the controller 46 extracts an abnormal region from the predicted second image 54. For example, in a case where an organ that is an imaging target is the brain, as described above, the controller 46 extracts an infarct region from the predicted second image 54 that is a predicted MRI image as an abnormal region. A method for extracting the abnormal region from the predicted second image 54 by the controller 46 is not particularly limited, but for example, an AI technique may be applied. Specifically, for example, a deep neural network in which the second image 52 or the predicted second image 54 is set as an input and an extracted abnormal region is set as an output is created. Then, a learned model obtained by causing the created deep neural network to be learned using teacher data including the second image 52 or the predicted second image 54 and the abnormal region in the second image 52 or the predicted second image 54 is stored in the storage section 22 in advance. The controller 46 inputs the predicted second image 54 generated by the prediction model 44 to the learned model, and acquires an abnormal region output from the learned model to extract the abnormal region from the predicted second image 54. The controller 46 may apply an existing image analysis technique to extract the abnormal region from the predicted second image 54.

In the next step S156, the controller 46 causes the display section 23 to display the first image 50 and the predicted second image 54. Further, the controller 46 causes the display section 23 to display the abnormal region extracted in step S154 on the first image 50 in an overlapping manner, and then terminates the prediction image generation process.

Figure 8:
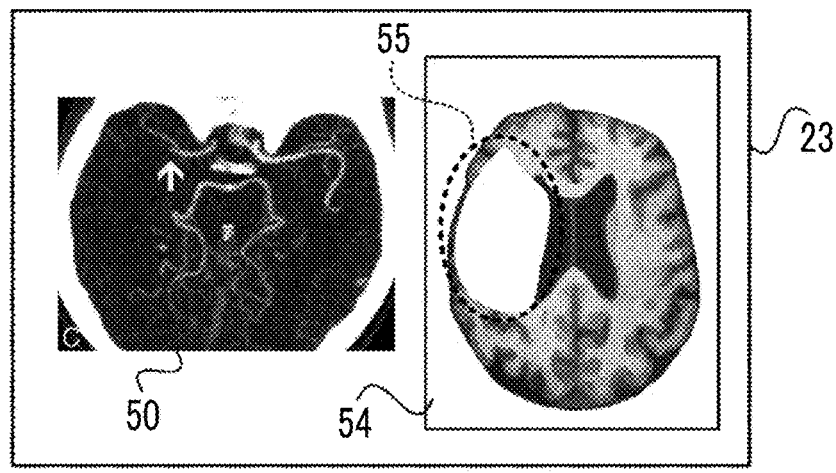
FIG. 8 is an explanatory diagram for illustrating a display state of the predicted second image or the like generated by the prediction model according to the first embodiment.

FIG. 8 shows an example of a state where the controller 46 causes the display section 23 to display the first image 50, the predicted second image 54, and information 55 indicating an abnormal region. In the example shown in FIG. 8, the first image 50 is a CT image of the brain, and the predicted second image 54 is an MRI image predicted from the first image 50. Further, the information 55 indicating the abnormal region is information indicating an infarct region. As the first image 50, the predicted second image 54, and the information 55 indicating the abnormal region are displayed on the display section 23, a doctor or the like can predict the presence or absence of cerebral infarction of a patient or an infarct region from the first image 50 with reference to the predicted second image 54 and the information 55 indicating the abnormal region.

Second Embodiment

In this embodiment, since a prediction model generation process of generating the prediction model 44 in the prediction apparatus 16 is different from the prediction model generation process (see FIGS. 4 and 5) in the first embodiment, the prediction model generation process in the prediction apparatus 16 in this embodiment will be described.

Figure 9:
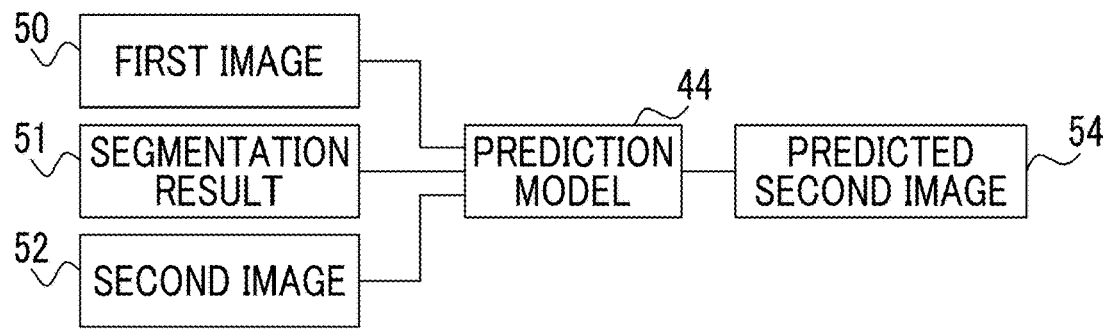
FIG. 9 is a conceptual diagram for illustrating generation of a prediction model according to a second embodiment.

FIG. 9 is a conceptual diagram for illustrating the generation of the prediction model 44 in the prediction apparatus 16 according to this embodiment. Similar to the first embodiment, as the CPU 20 executes the prediction model generation program 32, a prediction model generation process shown in FIG. 10 is executed.

Hereinafter, an example in which the prediction model 44 generates the second image 52 that is predicted from the first image 50 and outputs the second image 52 will be described. The first image 50 and the second image 52 are different types of medical captured images relating to the same organ of the same subject as described above.

Figure 10:
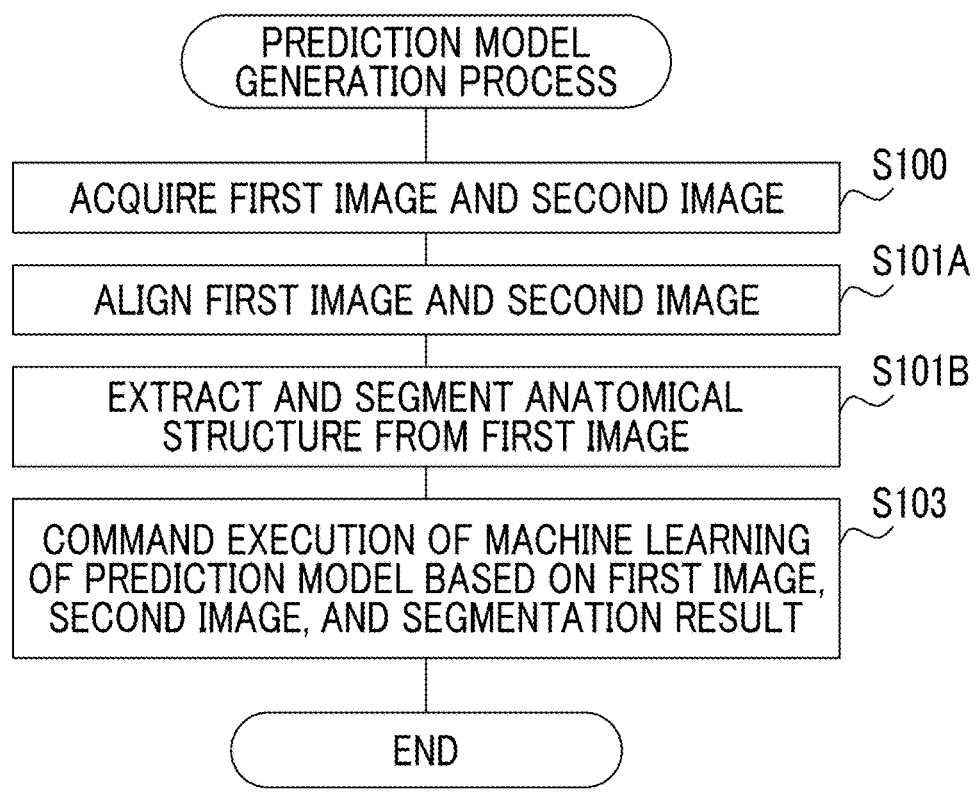
FIG. 10 is a flowchart showing an example of a prediction model generation process in the second embodiment.

The prediction model generation process according to this embodiment shown in FIG. 10 is different from the prediction model generation process (see FIG. 4) according to the first embodiment in that processes of step S101A and step S101B are performed between step S100 and step S102 and a process of step S103 is executed instead of the process of step S102. Thus, the different processes will be described.

In step S101A, the learning section 42 aligns positions of the first image 50 and the second image 52 acquired by the acquisition section 40, specifically, anatomical positions thereof.

In the next step S101B, the learning section 42 extracts an anatomical structure from the first image 50, and performs segmentation. For example, as described above, in a case where a portion that is an imaging target is the heart or the brain, a blood vessel region is extracted as an anatomical structure, and then, the extracted region is segmented. A method for extracting the anatomical structure from the first image 50 and a method for segmenting an extraction result by the learning section 42 are not particularly limited, and a known technique may be applied. A segmentation result 51 according to this embodiment is an example of an extraction result of the present disclosure.

In the next step S103, the learning section 42 commands execution of machine learning in which the first image 50 is an input captured image and a predicted second image 54 predicted from the first image 50 is an output captured image, using the first image 50, the second image 52, and the segmentation result 51 obtained by the step S101B, as shown in FIG. 9 to generate the prediction model 44, and then, terminates the prediction model generation process.

As described above, since the learning section 42 according to this embodiment performs learning by extracting an anatomical structure from the first image 50 and assigning the segmentation result 51 based on the extraction result as information that becomes a clue of learning of the prediction model 44, it is possible to enhance accuracy of learning.

As described above, the prediction apparatus 16 according to this embodiment comprises the learning section 42 that performs machine learning in which, with respect to a combination of different types of captured images obtained by imaging the same subject, one captured image is an input and another captured image is an output to generate the prediction model 44, and the controller 46 that performs a control for inputting the first image 50 to the prediction model 44 as an input captured image and outputting the predicted second image 54 that is a captured image having a type different from that of the input captured image.

For example, there is a tendency that an apparatus that captures an MRI image is more expensive than an apparatus that captures a CT image. Further, in order to comprise both the apparatuses, the size of a facility such as a hospital becomes large. For this reason, there is a case where only one type of captured image is present in a case where a doctor or the like performs diagnosis. Even in such a case, according to the prediction apparatus 16 in this embodiment, even in a case where only one type of captured image is present in diagnosis by a doctor or the like, it is possible to perform diagnosis support.

In the respective embodiments, as a specific position example, an example in which the first image 50 is a CT image and the second image 52 and the predicted second image 54 are MRI images has been described, but the respective embodiments are not limitative. The first image 50 and the second image 52 may be any one of a PET image obtained through PET or a diffusion weighted image, as well as the CT image and the MRI image. However, it is preferable that the first image 50 is a form image indicating the form of an imaging target, and it is preferable that the second image 52 is a function image indicating a function of the imaging target. Further, it is needless to say that a portion of the imaging target is not limited to the brain or the heart.

Further, in the respective embodiments, an example in which GAN is applied to machine learning of the prediction model 44 has been described, but the learning method is not particularly limited, and any method that uses deep learning may be used. For example, an example in which machine learning to which a convolution neural network (CNN) is applied is performed may be used.

Further, in the above-described embodiments, the variety of processes executed as the CPU executes software (program) may be executed by a variety of processors other than the CPU. In this case, the processors may include a programmable logic device (PLD) capable of changing a circuit configuration after manufacturing, such as a field-programmable gate array (FPGA), a dedicated electric circuit that is a processor having a circuit configuration that is dedicatedly designed for executing a specific process, such as an application specific integrated circuit (ASIC), or the like. Further, the variety of processes may be executed by one processor among the variety of processors described above, or may be executed by a combination of the same type or different types of two or more processors (for example, a combination of a plurality of FPGAs, a combination of an FPGA and a CPU, or the like). Further, a hardware structure of the variety of processors is specifically an electric circuit in which circuit elements such as a semiconductor element are combined.

In addition, in the above-described embodiments, a configuration in which the prediction model generation program 32 and the prediction image generation program 34 are stored (installed) in the storage section 22 in advance has been described, but the invention is not limited thereto. A configuration in which the prediction program 30 is provided in the form of being recorded on a recording medium such as a compact disc read only memory (CD-ROM), a digital versatile disk read only memory (DVD-ROM), or a universal serial bus (USB) may be used. Further, a configuration in which the prediction model generation program 32 and the prediction image generation program 34 are downloaded from an external apparatus through a network may be used.

What is claimed is:

1. A prediction apparatus comprising a processor and a memory,
the processor being configured to:
with respect to a combination of different types of captured images obtained by imaging the same subject, one captured image and an anatomical structure data obtained by extracting an anatomical structure from the captured image are set to an input to a generator of GAN (Generative Adversarial Network) and performing machine learning to generate a prediction model such that an error between an output captured image generated by the generator and another captured image is minimized and a determination rate of true and false in a discriminator of GAN for the output captured image is maximized; and
perform a control for inputting a captured image to the prediction model and outputting a captured image having a type different from that of the input captured image,
wherein the anatomical structure data is a segmentation data in which the anatomical structure is extracted from the captured image and a segmentation processing is performed on a captured region corresponding to the anatomical structure.

2. The prediction apparatus according to claim 1, wherein the different types of captured images are all medical captured images.

3. The prediction apparatus according to claim 2, wherein the type of the captured image input to the prediction model is a form image indicating a form of an imaging target, and the type of the captured image output from the prediction model is a function image indicating a function of the imaging target.

4. The prediction apparatus according to claim 3, wherein the form image indicates a form of at least one of a blood vessel region or a region where a cerebrospinal fluid flows, and the function image indicates a state of at least one of infarction or necrosis.

5. The prediction apparatus according to claim 2, wherein one of the type of the captured image input to the prediction model and the type of the captured image output from the prediction model is a computed tomography (CT) image, and the other thereof is any one of a magnetic resonance imaging (MRI) image, a positron emission computed tomography (PET) image, or a diffusion weighted image.

6. The prediction apparatus according to claim 5, wherein the subject is a heart or a brain.

7. The prediction apparatus according to claim 1, wherein the processor causes a display to display the captured image output from the prediction model.

8. The prediction apparatus according to claim 2, wherein the processor causes a display to display the captured image output from the prediction model.

9. The prediction apparatus according to claim 3, wherein the processor causes a display to display the captured image output from the prediction model.

10. The prediction apparatus according to claim 1, wherein the processor extracts an abnormal region where an abnormality occurs in the subject from the captured image output from the prediction model, and causes a display to display a captured image input to the prediction model corresponding to the captured image from which the abnormal region is extracted and information indicating the abnormal region.

11. The prediction apparatus according to claim 2, wherein the processor extracts an abnormal region where an abnormality occurs in the subject from the captured image output from the prediction model, and causes a display to display a captured image input to the prediction model corresponding to the captured image from which the abnormal region is extracted and information indicating the abnormal region.

12. The prediction apparatus according to claim 3,
wherein the processor extracts an abnormal region where an abnormality occurs in the subject from the captured image output from the prediction model, and causes a display to display a captured image input to the prediction model corresponding to the captured image from which the abnormal region is extracted and information indicating the abnormal region.

13. The prediction apparatus according to claim 1,
wherein the processor aligns positions of the subject in the one captured image and the other captured image in the machine learning.

14. The prediction apparatus according to claim 2,
wherein the processor aligns positions of the subject in the one captured image and the other captured image in the machine learning.

15. The prediction apparatus according to claim 3,
wherein the processor aligns positions of the subject in the one captured image and the other captured image in the machine learning.

16. A prediction method for causing a computer to execute a process of:
with respect to a combination of different types of captured images obtained by imaging the same subject, one captured image and an anatomical structure data obtained by extracting an anatomical structure from the captured image are set to an input to a generator of GAN (Generative Adversarial Network) and performing machine learning to generate a prediction model such that an error between an output captured image generated by the generator and another captured image is minimized and a determination rate of true and false in a discriminator of GAN for the output captured image is maximized; and
performing a control for inputting a captured image to the prediction model and outputting a captured image having a type different from that of the input captured image,
wherein the anatomical structure data is a segmentation data in which the anatomical structure is extracted from the captured image and a segmentation processing is performed on a captured region corresponding to the anatomical structure.

17. A non-transitory computer-readable storage medium storing a prediction program for causing a computer to execute a process of:
with respect to a combination of different types of captured images obtained by imaging the same subject, one captured image and an anatomical structure data obtained by extracting an anatomical structure from the captured image are set to an input to a generator of GAN (Generative Adversarial Network) and performing machine learning to generate a prediction model such that an error between an output captured image generated by the generator and another captured image is minimized and a determination rate of true and false in a discriminator of GAN for the output captured image is maximized; and
performing a control for inputting a captured image to the prediction model and outputting a captured image having a type different from that of the input captured image,
wherein the anatomical structure data is a segmentation data in which the anatomical structure is extracted from the captured image and a segmentation processing is performed on a captured region corresponding to the anatomical structure.

18. The prediction apparatus according to claim 1, wherein the anatomical structure is a blood vessel region in the captured image.

* * * * *